(12) United States Patent
Gal (10) Patent No.: US 9,672,598 B2
(45) Date of Patent: Jun. 6, 2017

(54) COLOR MOIRE REDUCING METHOD, COLOR MOIRE REDUCING APPARATUS, AND IMAGE PROCESSING APPARATUS

(71) Applicant: HANWHA TECHWIN CO., LTD., Changwon-si (KR)

(72) Inventor: Jun Ho Gal, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 91 days.

(21) Appl. No.: 14/684,584

(22) Filed: Apr. 13, 2015

(65) Prior Publication Data
US 2016/0163027 A1 Jun. 9, 2016

(30) Foreign Application Priority Data
Dec. 5, 2014 (KR) .................. 10-2014-0174259

(51) Int. Cl.
| | |
|---|---|
| G06T 5/00 | (2006.01) |
| G06T 5/20 | (2006.01) |
| H04N 9/64 | (2006.01) |
| H04N 5/21 | (2006.01) |
| G06T 7/90 | (2017.01) |

(52) U.S. Cl.
CPC ............... *G06T 5/003* (2013.01); *G06T 5/20* (2013.01); *G06T 7/90* (2017.01); *H04N 5/21* (2013.01); *H04N 9/646* (2013.01); *G06T 2207/10024* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,671,401 | B1 | 12/2003 | Adams, Jr. et al. | |
| 7,050,651 | B2 * | 5/2006 | Zaklika ................... | H04N 1/409 358/3.26 |
| 7,084,906 | B2 * | 8/2006 | Adams, Jr. ............. | H04N 9/045 348/222.1 |
| 7,577,315 | B2 * | 8/2009 | Uvarov ................. | G06T 11/001 348/E9.01 |
| 7,664,316 | B2 * | 2/2010 | Aoki ....................... | H04N 9/045 348/222.1 |
| 7,894,110 | B2 * | 2/2011 | Hasegawa ............. | G06T 3/4015 358/1.18 |
| 8,531,563 | B2 * | 9/2013 | Tanaka ............... | G02F 1/133514 348/222.1 |
| 9,288,454 | B2 * | 3/2016 | Tanaka ................... | H04N 9/045 |

(Continued)

FOREIGN PATENT DOCUMENTS

| | | |
|---|---|---|
| JP | 5-242239 A | 9/1993 |
| JP | 2010-25809 A | 2/2010 |

(Continued)

*Primary Examiner* — Anand Bhatnagar
(74) *Attorney, Agent, or Firm* — Sughrue Mion, PLLC (57) ABSTRACT

Provided are a color moire reducing method, a color moire reducing apparatus, and an image processing apparatus. The color moire reducing method includes calculating a plurality of local color mean values around a pixel in a selected region of a current image, calculating difference values between the local color mean values and a maximum difference value from among the difference values, and setting a moire correction weight to the pixel on the basis of the maximum difference value.

20 Claims, 7 Drawing Sheets

(56) References Cited

U.S. PATENT DOCUMENTS

| | | | |
|---|---|---|---|
| 9,369,686 B2* | 6/2016 | Hayashi | H04N 9/07 |
| 2007/0024914 A1 | 2/2007 | Chung et al. | |
| 2008/0012811 A1 | 1/2008 | Sung et al. | |
| 2008/0063297 A1* | 3/2008 | Chen | H04N 1/40075 |
| | | | 382/275 |
| 2010/0142817 A1* | 6/2010 | Chen | H04N 9/045 |
| | | | 382/167 |
| 2013/0064448 A1* | 3/2013 | Tomaselli | G06T 5/002 |
| | | | 382/167 |
| 2013/0308022 A1* | 11/2013 | Tanaka | G02F 1/133514 |
| | | | 348/280 |
| 2015/0172615 A1* | 6/2015 | Tanaka | H04N 9/045 |
| | | | 348/242 |

FOREIGN PATENT DOCUMENTS

| | | |
|---|---|---|
| KR | 10-2008-0006291 A | 1/2008 |
| KR | 10-1001894 B1 | 12/2010 |
| KR | 10-1104172 B1 | 1/2012 |
| KR | 10-1246958 B1 | 3/2013 |

* cited by examiner

COLOR MOIRE REDUCING METHOD, COLOR MOIRE REDUCING APPARATUS, AND IMAGE PROCESSING APPARATUS

CROSS-REFERENCE TO THE RELATED APPLICATION

This application claims priority from Korean Patent Application No. 10-2014-0174259, filed on Dec. 5, 2014, in the Korean Intellectual Property Office, the disclosure of which is incorporated herein in its entirety by reference.

BACKGROUND

1. Field

Methods and apparatuses consistent with exemplary embodiments relate to color moire reducing methods and color moire reducing apparatuses.

2. Description of the Related Art

A moire effect is a kind of aliasing effect, which occurs because a sampling frequency of an image sensor is lower than a frequency of a subject for image capturing. There is a case where an optical low pass filter is provided between an image sensor and a lens to address this problem. However, in this case, the attachment of a separate birefringent element is required and image resolution is degraded because filtering is performed also on a moireless region of the image.

SUMMARY

Exemplary embodiments of the inventive concept include image processing methods that may prevent an undesirable color blur effect while reducing a color moire.

Various aspects of the inventive concept will be set forth in part in the description which follows and, in part, will be apparent from the description, or may be learned by practice of the presented exemplary embodiments.

According to one or more exemplary embodiments, there is provided a color moire reducing method which may include: calculating a plurality of local color mean values around a pixel in a selected region of a current image; calculating difference values between the local color mean values and a maximum difference value from among the difference values; and setting a moire correction weight to the pixel on the basis of the maximum difference value.

The setting of the moire correction weight may include setting a value between a minimum weight and a maximum weight as the moire correction weight such that the maximum difference value and the moire correction weight are proportional to each other.

The minimum weight and the maximum weight may be set to 0 and 1 or 0 and 255, respectively.

The color moire reducing method may further include correcting color values of the pixel by applying the moire correction weight to the color values of the pixel.

A value of the moire correction weight may be set between a minimum weight and a maximum weight, and a moire correction degree of the pixel to be corrected may be in inverse proportion to the value of the moire correction weight.

The setting the moire correction weight may include: setting a maximum value of the moire correction weight to the pixel in response to the maximum difference value being greater than a threshold value; and setting a minimum value of the moire correction weight to the current pixel in response to the maximum difference value being smaller than or equal to the threshold value.

The color moire reducing method may further include: correcting a pixel value of the pixel by applying the maximum value of the moire correction weight to the pixel to generate an output pixel value which is substantially the same as the pixel value of the pixel before the correcting, in response to the maximum difference value being greater than the threshold value; and correcting a pixel value of the pixel by applying the minimum value of the moire correction weight to the pixel to generate an output pixel value which is more-corrected in response to the maximum difference value being smaller than or equal to the threshold value.

In the above method, the pixel may be determined as being included in an edge region of an object in the current image in response to the maximum difference value being greater than the threshold value.

The color moire reducing method may further include: calculating a plurality of global color mean values of a previous image that is input before the current image; and compensating the local color mean values of the current image by using the global color mean values of the previous image, wherein the calculating the difference values between the local color mean values and the maximum difference value comprises calculating difference values between the compensated local color mean values of the current image and a maximum difference value from among the different values between the compensated local color mean values.

According to one or more exemplary embodiments, there is provided a computer readable recording medium having recorded thereon a program for executing the above method.

According to one or more exemplary embodiments, there is provided a color moire reducing apparatus which may include: a local mean calculator configured to calculate a plurality of local color mean values around a pixel in a selected region of a current image, and calculate difference values between the local color mean values and a maximum difference value from among the difference values; and a weight setter configured to set a moire correction weight to the pixel on the basis of the maximum difference value.

The weight setter may set a value between a minimum weight and a maximum weight as the moire correction weight such that the maximum difference value and the moire correction weight are proportional to each other.

The minimum weight and the maximum weight may be set to 0 and 1 or 0 and 255, respectively.

The color moire reducing apparatus may further include an image corrector configured to correct color values of the pixel by applying the moire correction weight to the color values of the pixel.

A value of the moire correction weight may be set between a minimum weight and a maximum weight, and a moire correction degree of the pixel to be corrected may be in inverse proportion to the value of the moire correction weight.

The weight setter may set a maximum value of the moire correction weight to the pixel in response to the maximum difference value being greater than a threshold value, and set a minimum value of the moire correction weight to the pixel in response to the maximum difference value being smaller than or equal to the threshold value.

The color moire reducing apparatus may further include an image corrector configured to correct a pixel value of the pixel by applying the maximum value of the moire correction weight to the pixel to generate an output pixel value which is substantially the same as the pixel value of the pixel before the correcting, in response to the maximum difference value being greater than the threshold value, and correct a pixel value of the pixel by applying the minimum value of the moire correction weight to the pixel to generate an output pixel value which is more-corrected in response to the maximum difference value being smaller than or equal to the threshold value.

The pixel may be determined as being included in an edge region of an object in the current image in response to the maximum difference value being greater than the threshold value.

The color moire reducing apparatus may further include: a global mean calculator configured to calculate a plurality of global color mean values of a previous image that is input before the current image; and a mean compensator configured to compensate the local color mean values of the current image by using the global color mean values of the previous image, and calculate difference values between the compensated local color mean values of the current image and a maximum difference value from among the different values between the compensated local color mean values.

According to one or more exemplary embodiments, there is provided an image processing apparatus which may include: an image sensor to capture the current image; and the above color moire reducing apparatus.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION OF THE EXEMPLARY EMBODIMENTS

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the drawings, to explain aspects of the present description. As used herein, expressions such as "at least one of," when preceding a list of elements, modify the entire list of elements and do not modify the individual elements of the list.

The following description just illustrates the fundamentals of the inventive concept. Therefore, those of ordinary skill in the art may embody the fundamentals of the inventive concept and invent various apparatuses included in the scope of the inventive concept although the fundamentals of the inventive concept are not clearly described or illustrated in the specification. Also, conditional terms and embodiments in the specification are only intended to describe the inventive concept, and it should be understood that the scope of the inventive concept is not limited by the conditional terms and embodiments. Also, it should be understood that all of descriptions of fundamentals, aspects, embodiments of the inventive concept, and certain embodiments are intended to include structural and functional equivalents thereof. Also, it should be understood that such equivalents include not only well-known equivalents but also all equivalents that will be invented to perform the same function regardless of a structure thereof.

Thus, functions of various devices illustrated in the drawing including functional blocks represented as processors or similar concepts may be provided not only by using dedicated hardware but also by using hardware capable of performing relevant software. When provided by processors, the functions may be provided by a single dedicated processor, a single shared processor, or a plurality of individual processors, some of which may be shared. Also, terms used for a processor, control, or similar concepts may not be understood as exclusively citing hardware capable of performing software, and they may be understood as suggestively including digital signal processor (DSP) hardware, a read only memory (ROM), a random access memory (RAM), and a nonvolatile memory for storing software without limitation. Other well-known hardware structures may also be included.

The above advantages, features, and aspects of the inventive concept will become apparent from the following description of exemplary embodiments with reference to the accompanying drawings. In the following description, detailed descriptions of well-known functions or configurations will be omitted since they would unnecessarily obscure the subject matters of the inventive concept.

It will also be understood that the terms "comprises", "includes", and "has" used herein specify the presence of stated elements, but do not preclude the presence or addition of other elements, unless otherwise defined.

Hereinafter, exemplary embodiments will be described in detail with reference to the accompanying drawings.

Figure 1:
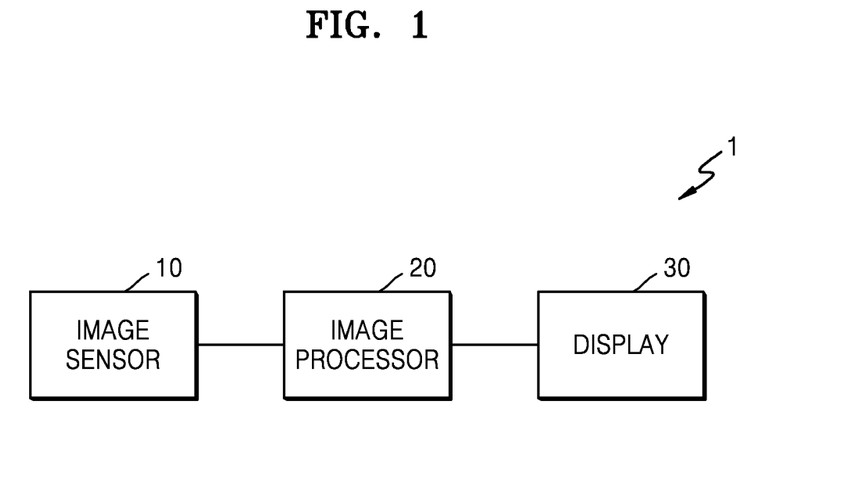
FIG. 1 is a schematic block diagram of an image processing apparatus according to an exemplary embodiment.

FIG. 1 is a schematic block diagram of an image processing apparatus 1 according to an exemplary embodiment.

Referring to FIG. 1, the image processing apparatus 1 may include an image sensor 10, an image processor 20, and a display 30.

As an example, the image processing apparatus 1 may be a portable camera, a camcorder, a mobile device such as a smartphone, a monitoring camera, such as a visual camera, a thermal camera, or a special-purpose camera, or any other device that may display moving images. The image processing apparatus 1 may include the image sensor 10, the image processor 20, and the display 30 in combination. As another example, the image processing apparatus 1 may be an image processing system in which at least one of the image sensor 10, the image processor 20, and the display 30 is implemented separately and they are connected by wire or wirelessly to transmit/receive data.

The image sensor 10 may be a photoelectric conversion device such as a charge-coupled device (CCD) or a complementary metal-oxide-semiconductor (CMOS) device. The image sensor 10 captures an image of a front scene to acquire image information. A lens (not illustrated) may be provided in front of the image sensor 10 to receive an optical signal.

The image processor 20 may be implemented by any number of hardware and/or software components that execute particular functions. For example, the image processor 20 may employ various integrated circuit (IC) components, such as memory elements, processing elements, logic elements, and lookup tables, which may execute various functions under the control of one or more microprocessors or other control devices. The functions of the image processor 20 may be implemented by programming or scripting languages by including various algorithms that are implemented by data structures, processes, routines, or any combination of other programming components.

The image processor 20 may perform a color moire correction function to reduce a moire effect in an image. A chroma blur trick may be used for moire correction. When a blur is applied to the chroma of a moireless region, a color blur effect occurs at an edge of an object having chroma. Thus, the image processor 20 according to an exemplary embodiment sets a moire correction weight to each pixel of the image in order to minimize or in order not to perform moire correction on an edge region of a color object. Here, the image may be a color image.

RGB mean values or color histograms of a color-moire region are uniform. On the other hand, RGB mean values or color histograms of a color-moireless region are different from one another. In particular, RGB mean values or color histograms of an edge region of a color object are significantly different from each other.

The image processor 20 may calculate a plurality of local color mean values around a pixel in a selected region of a current image (or image frame), differences between the local color mean values, and a maximum difference value, and set a moire correction weight to the pixel on the basis of the maximum difference value. Herein, the pixel values may be luminance values.

In an environment where the color temperature of an illuminant color may vary depending on time or weather conditions, for example, in a case where the illuminant color is red (e.g., a natrium lamp or a sunset field), an accurate moire region may not be detected.

For correction of the illuminant color of an image, the image processor 20 according to an exemplary embodiment calculates a plurality of global color mean values of a previous image (or image frame), and compensates the local color mean values of the current image by using the global color mean values of the previous image. The global color mean values may have been obtained at a previous time. The image processor 20 may calculate differences between the compensated local color mean values and a maximum difference value, and set a moire correction weight to the pixel on the basis of the maximum difference value.

The image processor 20 may set a value between a predetermined minimum weight and a predetermined maximum weight as the moire correction weight so that the maximum difference value and the moire correction weight are proportional to each other. The image processor 20 may correct a moire of the pixel by applying the moire correction weight to each of input color values of the pixel. By application of the moire correction weight, moire correction is not performed or is performed to a minimum degree on an edge region of a color object, and moire correction is performed on a moire region and a region that is a moireless region but has no color blur effect even when moire correction is performed thereon.

The image processor 20 may compare the maximum difference value with a predetermined threshold value, set a maximum value of the moire correction weight to the pixel if the maximum difference value is greater than the threshold value, and set a minimum value of the moire correction weight to the pixel if the maximum difference value is smaller than or equal to the threshold value. The image processor 20 may output a moire-corrected image by outputting the pixel, to which the maximum value of the moire correction weight is set, without moire correction, and outputting the pixel, to which the minimum value of the moire correction weight is set, with moire correction.

The display 30 may signal-process the moire-corrected image output from the image processor 20 and provide results to a user. The display 30 may include a liquid crystal display (LCD) panel, an organic light-emitting display (OLED) panel, or an electrophoretic display (EPD) panel. The display 30 may be provided in the form of a touchscreen capable of receiving an input according to a user's touch, to function as a user input interface.

Figure 2:
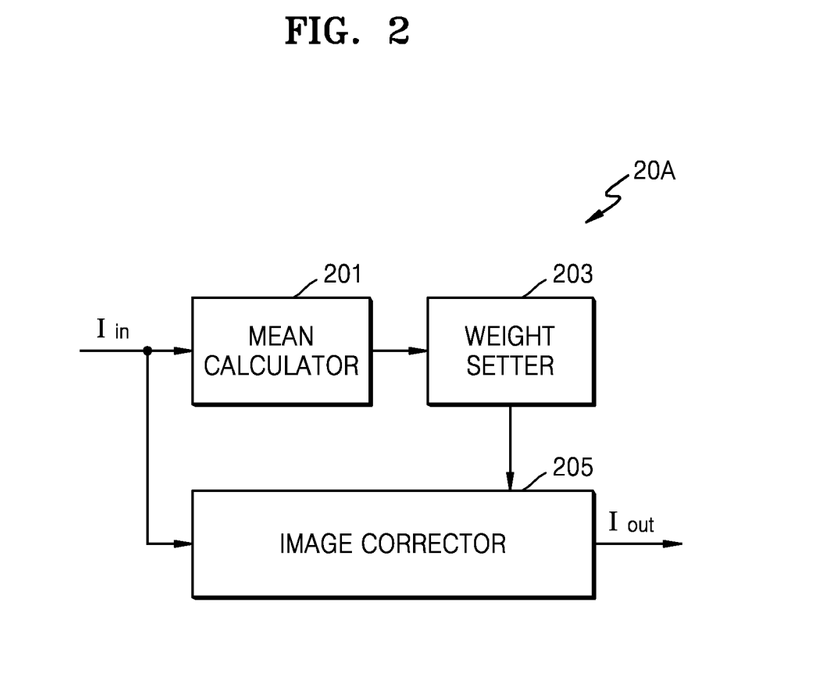
FIG. 2 is a schematic block diagram of a color moire reducer according to an exemplary embodiment.

FIG. 2 is a schematic block diagram of a color moire reducer 20A according to an exemplary embodiment.

The color moire reducer 20A according to an exemplary embodiment may be implemented as a portion of the image processor 20 illustrated in FIG. 1. The color moire reducer 20A may include a mean calculator 201, a weight setter 203, and an image corrector 205.

The mean calculator 201 calculates a local mean value of each color of red, green and blue (RGB) around each pixel in an input image, differences between the local color mean values, and a maximum difference among the differences. Hereinafter, a certain pixel, for example, a pixel of coordinates (i,j) in the input image which is a current image (hereinafter referred to as "current pixel") will be described as an example.

Referring to Equations 1 below, the mean calculator 201 calculates local RGB mean values of pixel in a block (e.g., (2n+1)×(2m+1) block, where n and m are positive integers) around the current pixel, that is, a mean value of input red values IN_R[i,j], a mean value of input green values IN_G[i,j], and a mean value of input blue values IN_B[i,j] around the current pixel. In other words, the mean calculator 201 calculates a red local mean value LM_R[i,j], a green local mean value LM_G[i,j], and a blue local mean value LM_B[i,j] around the current pixel in the block. Each of the red local mean value LM_R[i,j], the green local mean value LM_G[i,j], and the blue local mean value LM_B[i,j] may have one of values 0 to 255.

$$LM\_R[i, j] = \sum_{k \in \{-n,+n\}} \sum_{l \in \{-m,+m\}} IN\_R[i+k, j+l] \div$$
$$((2n+1) \times (2m+1))$$

$$LM\_G[i, j] = \sum_{k \in \{-n,+n\}} \sum_{l \in \{-m,+m\}} IN\_G[i+k, j+l] \div$$
$$((2n+1) \times (2m+1))$$

$$LM\_B[i, j] = \sum_{k \in \{-n,+n\}} \sum_{l \in \{-m,+m\}} IN\_B[i+k, j+l] \div$$
$$((2n+1) \times (2m+1))$$

$$LM\_R[i, j] \in \{0, 255\}$$
$$LM\_G[i, j] \in \{0, 255\}$$
$$LM\_B[i, j] \in \{0, 255\}$$

[Equations 1]

Referring to Equations 2 below, the mean calculator 201 calculates the maximum difference value among the difference values between the local color mean values around the current pixel. AD_RG[i,j] may be an absolute value of a difference value between the red local mean value LM_R[i,j] and the green local mean value LM_G[i,j] around the current pixel. AD_GB[i,j] may be an absolute value of a difference value between the green local mean value LM_G[i,j] and the blue local mean value LM_B[i,j] around the current pixel. AD_BR[i,j] may be an absolute value of a difference value between the blue local mean value LM_B[i,j] and the red local mean value LM_R[i,j] around the current pixel. The mean calculator 201 selects the maximum difference value MD_RGB[i,j] among the difference values between the local color mean values around the current pixel. When MD_RGB[i,j] is high, e.g., greater than a threshold value, it indicates that the current pixel is included in an edge region of a color object in the input image. On the other hand, when MD_RGB[i,j] is low, e.g., smaller than the threshold value, it indicates that the current pixel is included in a moire region or a region that has no color blur effect even when moire correction is performed thereon.

$$AD\_RG[i,j]=abs(LM\_R[i,j]-LM\_G[i,j])$$

$$AD\_GB[i,j]=abs(LM\_G[i,j]-LM\_B[i,j])$$

$$AD\_BR[i,j]=abs(LM\_B[i,j]-LM\_R[i,j])$$

$$MD\_RGB[i,j]:\max(AD\_RG[i,j],AD\_GB[i,j],AD\_BR[i,j]) \quad \text{[Equations 2]}$$

The weight setter 203 sets a moire correction weight to the current pixel on the basis of the maximum difference value with respect to the current pixel. Referring to Equation 3 below, the weight setter 203 may set a moire correction weight W_MOIRE[i,j] by adjusting the maximum difference value MD_RGB[i,j] with respect to the current pixel to values A and B. The values A and B may be functions or constants set by experience or experiments. The maximum difference value and the moire correction weight are proportional to each other. That is, as the maximum difference value increases, the moire correction weight increases. The moire correction weight may have a value between a minimum weight $W_{min}$ and a maximum weight $W_{max}$. For example, the moire correction weight may have one of values 0 to 255 or one of values 0 to 1 according to settings. Equation 3 is an example moire correction weight which is set to one of values 0 to 255. Since the moire correction weight is set according to the maximum difference value with respect to each pixel, a moire correction may be smoothly performed on the image.

$$W\_MOIRE[i,j]=A \times MD\_RGB[i,j]+B,$$

$$W\_MOIRE[i,j] \in \{0,255\} \quad \text{[Equation 3]}$$

The weight setter 203 may set the moire correction weight to one of the minimum weight $W_{min}$ and the maximum weight $W_{max}$. For example, the weight setter 203 may set the moire correction weight to a value 0 or 255 or a value 0 or 1. In this case, an amount and time for calculating the moire correction may be reduced in comparison with the case where the moire correction weight is set to one of values 0 to 255 or one of values 0 to 1. The weight setter 203 may compare the maximum difference value with respect to the current pixel with a threshold value and set the minimum weight $W_{min}$ or the maximum weight $W_{max}$ as the moire correction weight to the current pixel. Equation 4 is an example moire correction weight which is set to 0 or 1. Referring to Equation 4, when the maximum difference value MD_RGB[i,j] with respect to the current pixel is greater than the threshold value, the weight setter 203 may set the moire correction weight to 1. When the maximum difference value MD_RGB[i,j] with respect to the current pixel is smaller than or equal to the threshold value, the weight setter 203 may set the moire correction weight to 0.

$$\text{if } (MD\_RGB[i,j]>\text{Threshold}), W\_MOIRE[i,j]=1,$$

$$\text{else } W\_MOIRE[i,j]=0 \quad \text{[Equation 4]}$$

When the moire correction weight W_MOIRE[i,j] is set to a value between the minimum weight $W_{min}$ and the maximum weight $W_{max}$, the image corrector 205 corrects the current pixel by applying the moire correction weight W_MOIRE[i,j]. Referring to Equations 5 below, the image corrector 205 performs moire correction on the current pixel by applying the moire correction weight W_MOIRE[i,j] to each input color value of the current pixel. As expressed in Equations 5, a moire correction result of each color of the current pixel may be represented as a sum of a product of the moire correction weight W_MOIRE[i,j] and each input color value (IN_R[i,j], IN_G[i,j] or IN_B[i,j]) of the current pixel and a product of 255−W_MOIREI[i,j] and each color moire correction value (AM_R[i,j], AM_G[i,j] or AM_B[i,j]) for the current pixel which will be discussed later, that is, a weighted sum of an input value and a moire correction value of the current pixel. As the moire correction weight W_MOIRE[i,j] increases, a pixel value output from moire correction approaches the input value; and as the moire correction weight W_MOIRE[i,j] decreases, the output pixel value approaches the moire correction value. When the moire correction weight W_MOIRE[i,j] is the maximum weight of 255, the input value of the pixel is output without moire correction; and when the moire correction weight W_MOIRE[i,j] is the minimum weight of 0, the moire-corrected value of the pixel is output.

$$PO\_R[i,j]=\{W\_MOIRE[i,j] \times IN\_R[i,j]+(255-W\_MOIREI[i,j]) \times AM\_R[i,j]\} \div 255$$

$$PO\_G[i,j]=\{W\_MOIRE[i,j] \times IN\_G[i,j]+(255-W\_MOIREI[i,j]) \times AM\_G[i,j]\} \div 255$$

$$PO\_B[i,j]=\{W\_MOIRE[i,j] \times IN\_B[i,j]+(255-W\_MOIREI[i,j]) \times AM\_B[i,j]\} \div 255$$

$$PO\_R[i,j] \in \{0,255\}$$

$$PO\_G[i,j] \in \{0,255\}$$

$$PO\_B[i,j] \in \{0,255\} \quad \text{[Equations 5]}$$

When the moire correction weight W_MOIRE[i,j] is set to the minimum weight $W_{min}$ or maximum weight $W_{max}$, the image corrector 205 outputs a pixel value of the pixel, to which the maximum weight $W_{max}$ (e.g., 1) is set, without moire correction, and outputs a pixel value of the pixel, to which the minimum weight $W_{min}$ (e.g., 0) is set, with moire correction, as expressed in Equations 6 below. Each of PO_R[i,j], PO_G[i,j], and PO_B[i,j] is the output value of the current pixel by the image corrector 205.

$$PO\_R[i,j]=W\_MOIRE[i,j] \times IN\_R[i,j]+(1-W\_MOIREI[i,j]) \times AM\_R[i,j]$$

$$PO\_G[i,j]=W\_MOIRE[i,j] \times IN\_G[i,j]+(1-W\_MOIREI[i,j]) \times AM\_G[i,j]$$

$$PO\_B[i,j]=W\_MOIRE[i,j] \times IN\_B[i,j]+(1-W\_MOIREI[i,j]) \times AM\_B[i,j]$$

$$PO\_R[i,j] \in \{0,255\}$$

$PO\_G[i,j] \in \{0,255\}$ $PO\_B[i,j] \in \{0,255\}$ [Equation 6]

The image corrector 205 may obtain moire correction values for the current pixel as expressed in Equations 7 below. An input white value IN_W[i,j] of the current pixel is calculated from a mean of an input red value IN_R[i,j], an input green value IN_G[i,j], and an input blue value IN_B[i,j]. As expressed in Equation 7s below, a moire correction value for each color of the current pixel may be represented as a product of the input white value IN_W[i,j] and a value obtained by dividing a sum of each input color values of pixels in a block by a sum of input white values of the pixels in the block. Herein, the pixels in the block are pixels in a (2n+1)×(2m+1) block (where n and m are positive integers) around the current pixel. AM_R[i,j] is a moire correction value for the input red value of the current pixel. AM_G[i,j] is a moire correction value for the input green value of the current pixel. AM_B[i,j] is a moire correction value for the input blue value of the current pixel. As described above, these moire correction values AM_R[i,j], AM_G[i,j] and AM_B[i,j] are used along with the moire correction weight W_MOIRE[i,j] to generate the moire correction results PO_R[i,j], PO_G[i,j] and PO_B[i,j] which are the pixel values output from the image corrector 205.

$$AM\_R[i,j] = \quad \text{[Equation 7]}$$

$$IN\_W[i,j] \times \sum_{k \in [-n,+n]} \sum_{l \in [-m,+m]} IN\_R[i+k, j+l] \div$$

$$\sum_{k \in [-n,+n]} \sum_{l \in [-m,+m]} IN\_W[i+k, j+l]$$

$$AM\_G[i,j] = IN\_W[i,j] \times$$

$$\sum_{k \in [-n,+n]} \sum_{l \in [-m,+m]} IN\_G[i+k, j+l] \div$$

$$\sum_{k \in [-n,+n]} \sum_{l \in [-m,+m]} IN\_W[i+k, j+l]$$

$$AM\_B[i,j] = IN\_W[i,j] \times$$

$$\sum_{k \in [-n,+n]} \sum_{l \in [-m,+m]} IN\_B[i+k, j+l] \div$$

$$\sum_{k \in [-n,+n]} \sum_{l \in [-m,+m]} IN\_W[i+k, j+l]$$

$$IN\_W[i,j] = (IN\_R[i,j] + IN\_G[i,j] + IN\_B[i,j]) \div 3$$

The image corrector 205 may adjust the moire correction degree of the current pixel by the moire correction weight W_MOIRE[i,j].

Figure 3:
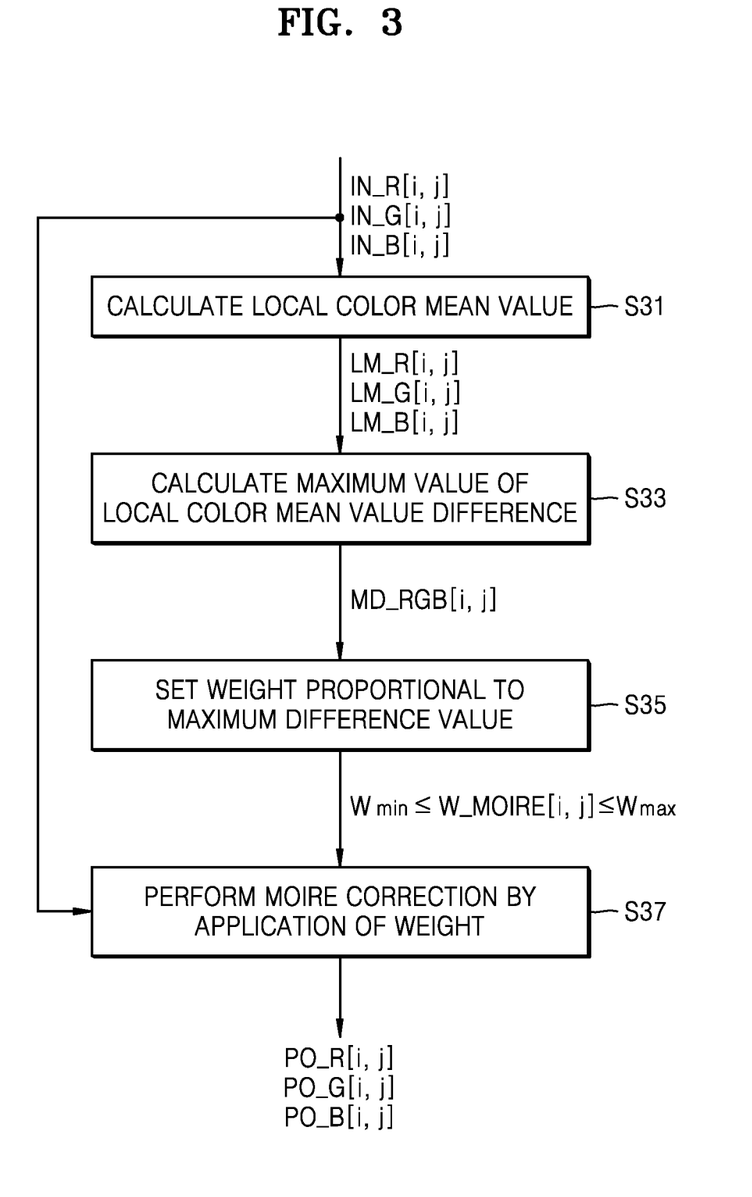
FIG. 3 is a schematic flowchart of a color moire reducing method according to an exemplary embodiment.

FIG. 3 is a schematic flowchart of a color moire reducing method according to an exemplary embodiment.

Referring to FIG. 3, an image processor calculates local color mean values LM_R[i,j], LM_G[i,j] and LM_B[i,j], around a current pixel of an input image by using input color values of pixels in each predetermined-size region or block around the current pixel of the input image, that is, an input red value IN_R[i,j], an input green value IN_G[i,j], and an input blue value IN_B[i,j] (S31).

The image processor calculates difference values between the local color mean values LM_R[i,j], LM_G[i,j] and LM_B[i,j] around the current pixel and calculates a maximum difference value MD_RGB[i,j] (S33).

The image processor sets a moire correction weight W_MOIRE[i,j] proportional to the maximum difference value MD_RGB[i,j] around the current pixel (S35). The moire correction weight W_MOIRE[i,j] may be set to a value between the minimum weight $W_{min}$ and the maximum weight $W_{max}$, for example, a value ranging from 0 to 255 or a value ranging from 0 to 1.

The image processor performs moire correction by applying the moire correction weight W_MOIRE[i,j] to the current pixel and outputs results PO_R[i,j], PO_G[i,j] and PO_B[i,j] (S37).

Figure 4:
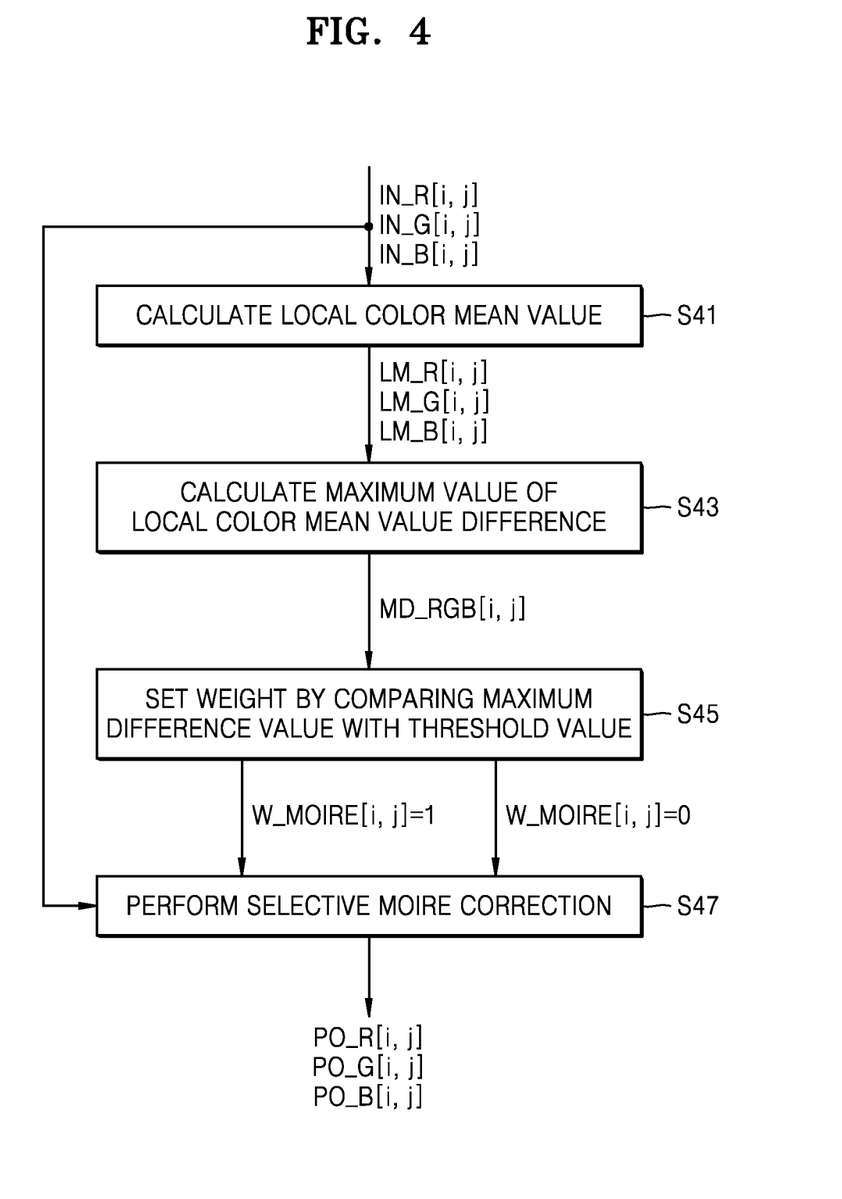
FIG. 4 is a schematic flowchart of a color moire reducing method according to another exemplary embodiment.

FIG. 4 is a schematic flowchart of a color moire reducing method according to another exemplary embodiment.

Referring to FIG. 4, an image processor calculates local color mean values LM_R[i,j], LM_G[i,j] and LM_B[i,j] around a current pixel of an input image by using input color values of pixels in each predetermined-size region or block around the current pixel of the input image, that is, an input red value IN_R[i,j], an input green value IN_G[i,j] and an input blue value IN_B[i,j] (S41).

The image processor calculates difference values between the local color mean values LM_R[i,j], LM_G[i,j] and LM_B[i,j] around the current pixel and calculates a maximum difference value MD_RGB[i,j] (S43).

The image processor sets a moire correction weight W_MOIRE[i,j] by comparing the maximum difference value MD_RGB[i,j] with respect to the current pixel with the threshold value (S45). The moire correction weight W_MOIRE[i,j] may be set to the minimum weight $W_{min}$ or the maximum weight $W_{max}$, for example, a value 0 or 255 or a value 0 or 1, respectively. When the maximum difference value MD_RGB[i,j] with respect to the current pixel is greater than a threshold value, the image processor may determine the current pixel as an edge pixel and set the maximum weight $W_{max}$ (255 or 1) to the current pixel. On the other hand, when the maximum difference value MD_RGB[i,j] with respect to the current pixel is smaller than or equal to the threshold value, the image processor may determine the current pixel as a moire pixel or a pixel, which is a moireless pixel but has no color blur even when moire correction is performed thereon, and set the minimum weight $W_{min}$ (0).

The image processor performs moire correction on the current pixel selectively according to the moire correction weight W_MOIRE[i,j] and outputs the results PO_R[i,j], PO_G[i,j] and PO_B[i,j] (S47). The image processor outputs a pixel value of the current pixel, to which the maximum weight $W_{max}$ is set, without moire correction, and outputs a pixel value of the current pixel, to which the minimum weight $W_{min}$ is set, with moire correction.

Figure 5:
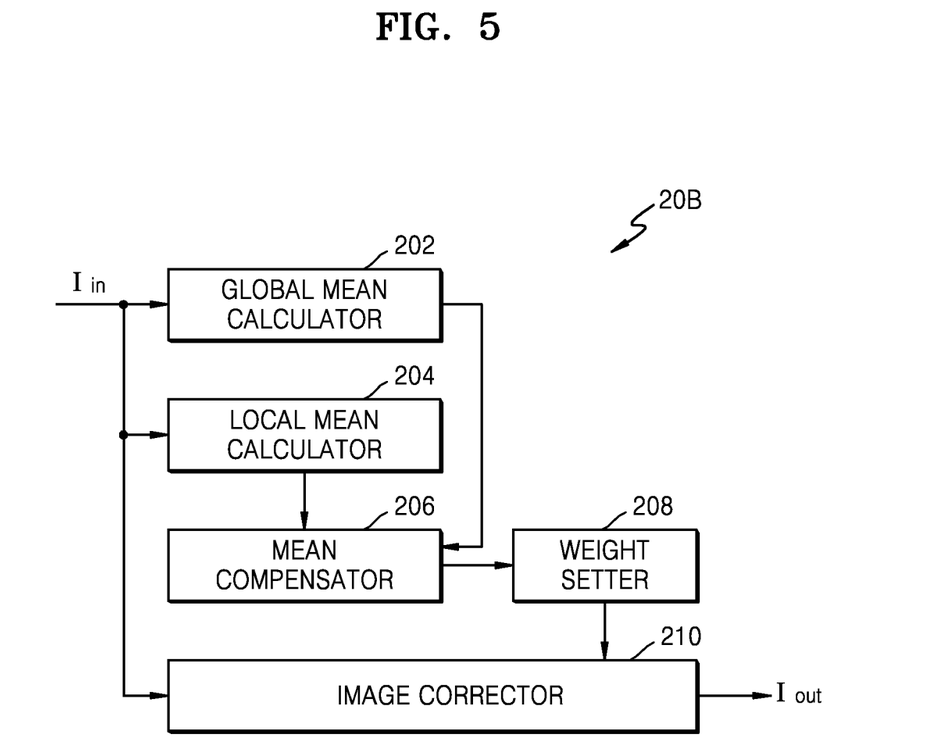
FIG. 5 is a schematic block diagram of a color moire reducer according to another exemplary embodiment.

FIG. 5 is a schematic block diagram of a color moire reducer 20B according to another exemplary embodiment.

The color moire reducer 20B according to another exemplary embodiment may be implemented as a portion of the image processor 20 illustrated in FIG. 1. The color moire reducer 20B may include a global mean calculator 202, a local mean calculator 204, a mean compensator 206, a weight setter 208, and an image corrector 210.

The global mean calculator 202 calculates a global mean value of each color of an input image $I_{in}$ and a maximum mean value among the global color mean values. The global color mean values are variables for illuminant color prediction. Referring to Equation 8 below, the global mean calculator 202 calculates a red global mean value GM_R, a green global mean value GM_G and a blue global mean value GM_B of the input image $I_{in}$, and the maximum global mean value GM_M among the red, green and blue global mean values GM_R, GM_G and GM_B. Each of the red global mean value GM_R, the green global mean value GM_G and the blue global mean value GM_B may have one of values 0 to 255. The global mean calculator 202 may temporarily store the red global mean value GM_R, the green global mean value GM_G and the blue global mean value GM_B of the input image $I_{in}$ along with the maximum global mean value GM_M in a storage such as a memory, delay them by one frame, and then output the same.

$$GM\_R \in \{0,255\}$$

$$GM\_G \in \{0,255\}$$

$$GM\_B \in \{0,255\}$$

$$GM\_M = \max(GM\_R, GM\_G, GM\_B) \quad \text{[Equation 8]}$$

The local mean calculator 204 calculates a local mean value of each color of red, green and blue around each pixel in the input image $I_{in}$. Since the calculation of the local color mean values by the local mean calculator 204 has been described with reference to Equations 1, a detailed description thereof will be omitted for conciseness.

The mean compensator 206 compensates the local color mean values around a current pixel of a current image according to illuminant colors by using a plurality of global color mean values GM_R, GM_G and GM_B of a previous image that is input before the current image, and a maximum global mean value GM_M that is a maximum value of the global color mean values GM_R, GM_G and GM_B. Since the illuminant color does not rapidly change with time, the mean compensator 206 uses the global color mean values of the previous image, and in this case, an iteration operation is unnecessary.

Referring to Equations 9 below, the mean compensator 206 calculates compensated local color mean values CM_R[i,j], CM_G[i,j] and CM_B[i,j] by compensating the local color mean values around the current pixel. The mean compensator 206 may compensate the local color mean values according to illuminant colors by applying a ratio of the maximum global mean value GM_M to each of the global color mean values GM_R, GM_G and GM_B to each of the local color mean values LM_R[i,j], LM_G[i,j] and LM_B[i,j].

$$CM\_R[i,j] = LM\_R[i,j] \times GM\_M \div GM\_R$$

$$CM\_G[i,j] = LM\_G[i,j] \times GM\_M \div GM\_G$$

$$CM\_B[i,j] = LM\_B[i,j] \times GM\_M \div GM\_B$$

$$CM\_R \in \{0,255\}$$

$$CM\_G \in \{0,255\}$$

$$CM\_B \in \{0,255\} \quad \text{[Equations 9]}$$

The mean compensator 206 may calculate a maximum difference value among difference values between the compensated local color mean values CM_R[i,j], CM_G[i,j] and CM_B[i,j] as expressed in Equations 10 below. AD_RG[i,j] may be an absolute value of a difference value between the compensated red local mean value CM_R[i,j] and the compensated green local mean value CM_G[i,j] around the current pixel. AD_GB[i,j] may be an absolute value of a difference between the compensated green local mean value CM_G[i,j] and the compensated blue local mean value CM_B[i,j] around the current pixel. AD_BR[i,j] may be an absolute value of a difference between the compensated blue local mean value CM_B[i,j] and the compensated red local mean value CM_R[i,j] around the current pixel. MD_RGB[i,j] is the maximum difference value among the difference values between the compensated local color mean values. When MD_RGB[i,j] is high, e.g., greater than a threshold value, it may be determined that the current pixel is included in an edge region of a color object in the input image. On the other hand, when MD_RGB[i,j] is low, e.g., smaller than a threshold value, it may be determined that the current pixel is included in a moire region or a region that has no color blur effect even when moire correction is performed thereon.

$$AD\_RG[i,j] = abs(CM\_R[i,j] - CM\_G[i,j])$$

$$AD\_GB[i,j] = abs(CM\_G[i,j] - CM\_B[i,j])$$

$$AD\_BR[i,j] = abs(CM\_B[i,j] - CM\_R[i,j])$$

$$MD\_RGB[i,j] = \max(AD\_RG[i,j], AD\_GB[i,j], AD\_BR[i,j]) \quad \text{[Equation 10]}$$

In an exemplary embodiment, the maximum difference value is calculated by the mean compensator 206. However, the maximum difference value may also be calculated by the local mean calculator 204.

The weight setter 208 sets a moire correction weight to the current pixel on the basis of the maximum difference value with respect to the current pixel. Since the setting of the moire correction weight has been described with reference to Equations 3 and 4, a detailed description thereof will be omitted for conciseness.

The image corrector 210 corrects a moire of the current pixel by applying the moire correction weight W_MOIRE[i,j]. Since the moire correction has been described with reference to Equations 5 to 7, a detailed description thereof will be omitted for conciseness.

Figure 6:
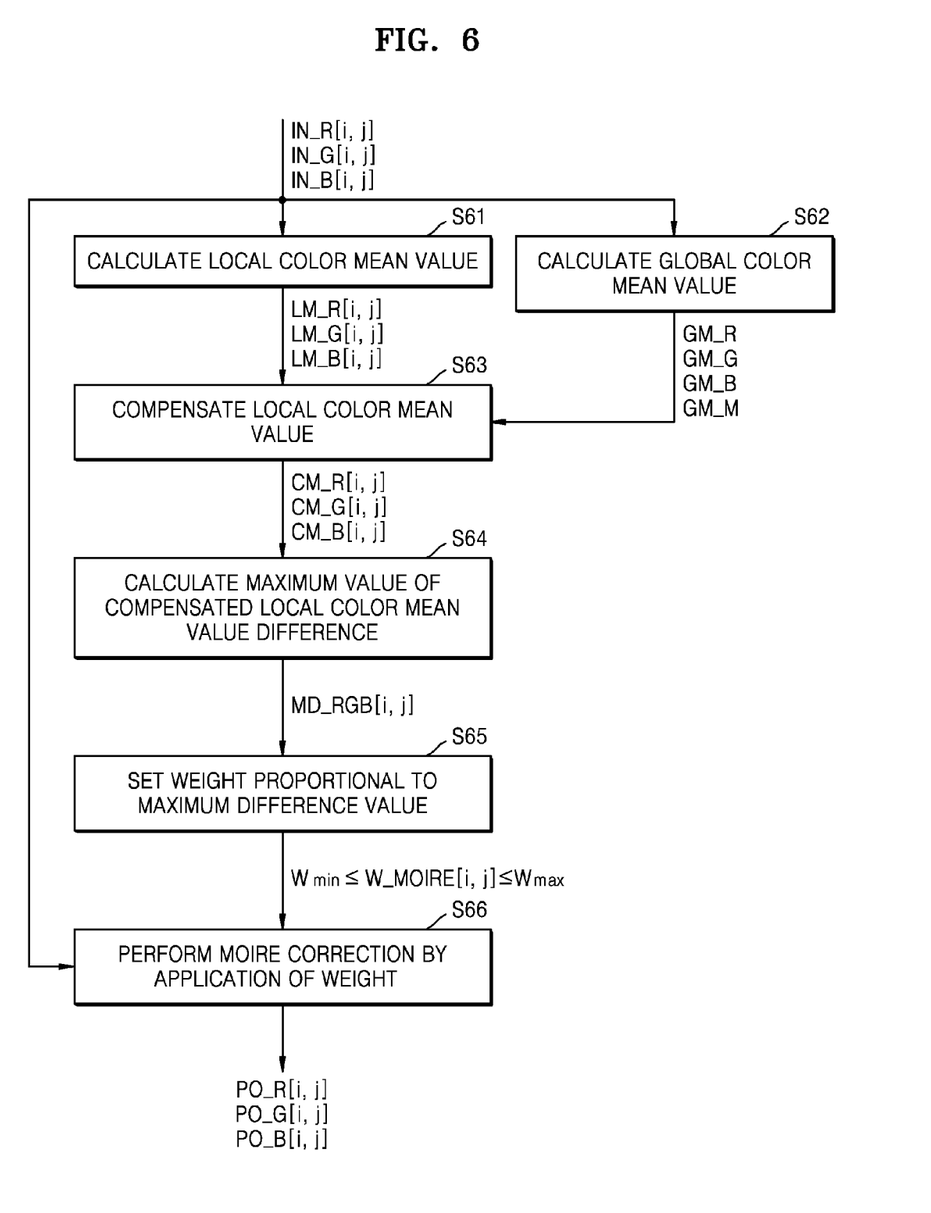
FIG. 6 is a schematic flowchart of a color moire reducing method according to an exemplary embodiment.

FIG. 6 is a schematic flowchart of a color moire reducing method according to an exemplary embodiment.

Referring to FIG. 6, an image processor calculates local color mean values LM_R[i,j], LM_G[i,j] and LM_B[i,j] around a current pixel of a current image by using input color values of pixels in a predetermined-size region or block around the current pixel of the current image, that is, an input red value IN_R[i,j], an input green value IN_G[i,j] and an input blue value IN_B[i,j] (S61).

The image processor calculates global color mean values GM_R, GM_G and GM_B of a current image and a maximum global mean value GM_M (S62). The global color mean values GM_R, GM_G and GM_B and the maximum global mean value GM_M may be stored in a storage and then used to compensate the local color mean values LM_R[i,j], LM_G[i,j] and LM_B[i,j] of a next image which is the current image in S61.

The image processor calculates the compensated local color mean values CM_R[i,j], CM_G[i,j] and CM_B[i,j] by compensating the local color mean values LM_R[i,j], LM_G[i,j] and LM_B[i,j] around the current pixel of the current image by using the global color mean values GM_R, GM_G and GM_B of a previous image, which is the current image in S62, and the maximum global mean value GM_M stored in the storage (S63).

The image processor calculates difference values between the compensated local color mean values CM_R[i,j], CM_G[i,j] and CM_B[i,j] around the current pixel and calculates a maximum difference value MD_RGB[i,j] (S64).

The image processor sets a moire correction weight W_MOIRE[i,j] proportional to the maximum difference value MD_RGB[i,j] with respect to the current pixel (S65). The moire correction weight W_MOIRE[i,j] may be set to a value between a minimum weight $W_{min}$ and a maximum weight $W_{max}$, for example, a value ranging from 0 to 255 or a value ranging from 0 to 1.

The image processor performs moire correction on the current pixel by applying the moire correction weight W_MOIRE[i,j] to the current pixel and outputs results PO_R[i,j], PO_G[i,j] and PO_B[i,j] (S66).

Figure 7:
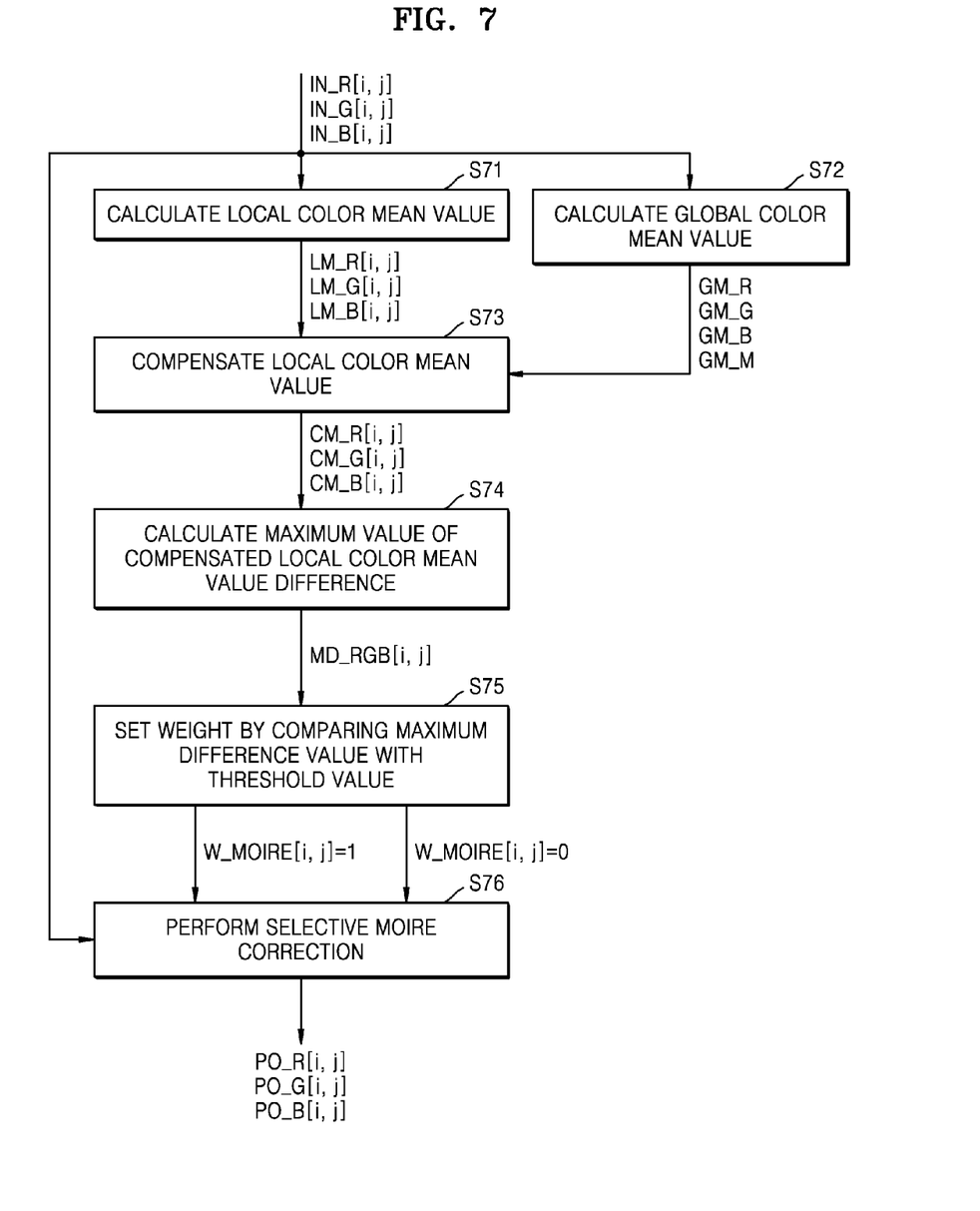
FIG. 7 is a schematic flowchart of a color moire reducing method according to another exemplary embodiment.

FIG. 7 is a schematic flowchart of a color moire reducing method according to another exemplary embodiment.

Referring to FIG. 7, an image processor calculates local color mean values LM_R[i,j], LM_G[i,j] and LM_B[i,j] of a current pixel of a current image by using input color values of the current pixel of the current image, that is, an input red value IN_R[i,j], an input green value IN_G[i,j] and an input blue value IN_B[i,j] (S71).

The image processor calculates global color mean values GM_R, GM_G and GM_B of a current image and a maximum global mean value GM_M (S72). The global color mean values GM_R, GM_G and GM_B and the maximum global mean value GM_M may be stored in a storage and then used to compensate the local color mean values LM_R[i,j], LM_G[i,j] and LM_B[i,j] of a next image which is the current image in S71.

The image processor calculates the compensated local color mean values CM_R[i,j], CM_G[i,j] and CM_B[i,j] by compensating the local color mean values LM_R[i,j], LM_G[i,j] and LM_B[i,j] around the current pixel of the current image by using the global color mean values GM_R, GM_G and GM_B of a previous image, which is the current image in S72, and the maximum global mean value GM_M stored in the storage (S73).

The image processor calculates difference values between the compensated local color mean values CM_R[i,j], CM_G[i,j] and CM_B[i,j] around the current pixel and calculates a maximum difference value MD_RGB[i,j] (S74).

The image processor sets a moire correction weight W_MOIRE[i,j] by comparing the maximum difference value MD_RGB[i,j] with respect to the current pixel with a threshold value (S75). The moire correction weight W_MOIRE[i,j] may be set to the minimum weight $W_{min}$ or the maximum weight $W_{max}$, for example, a value 0 or 255 or a value 0 or 1, respectively. When the maximum difference value MD_RGB[i,j] of the current pixel is greater than the threshold value, the image processor may determine the current pixel as an edge pixel and set the maximum weight $W_{max}$ (255 or 1) to the current pixel. On the other hand, when the maximum difference value MD_RGB[i,j] of the current pixel is smaller than or equal to the threshold value, the image processor may determine the current pixel as a moire pixel or a pixel, which is a moireless pixel but has no color blur even when moire correction is performed thereon, and set the minimum weight $W_{min}$ (0) to the current pixel.

The image processor performs moire correction on the current pixel selectively according to the moire correction weight W_MOIRE[i,j] and outputs results PO_R[i,j], PO_G[i,j] and PO_B[i,j] (S76). The image processor outputs a pixel value of the current pixel, to which the maximum weight $W_{max}$ is set, without moire correction, and outputs a pixel value of the current pixel, to which the minimum weight $W_{min}$ is set, with moire correction.

According to the exemplary embodiments, since color moire correction is performed by discriminating between a color moire region and an object edge region by using local color mean values and, if necessary, global color mean values, a color moire may be reduced and a color blur effect of the object edge region may be prevented. Also, according to the exemplary embodiments, since illuminant colors are compensated, color moire correction robust to illumination may be performed.

As described above, according to the above exemplary embodiments, the color moire reducing methods and apparatuses may prevent an undesirable color blur effect while reducing a color moire.

The color moire reducing methods according to the exemplary embodiments may be used to correct a color moire of a digital image of an image system using a Bayer or CCD/CMOS image sensor.

The color moire reducing methods according to the exemplary embodiments may also be embodied as computer-readable codes on a computer-readable recording medium. The computer-readable recording medium may be any data storage device that may store data which may be thereafter read by a computer system. Examples of the computer-readable recording medium may include read-only memories (ROMs), random access memories (RAMs), Compact Disc (CD)-ROMs, magnetic tapes, floppy disks, and optical data storages, not being limited thereto. The computer-readable recording medium may also be distributed over network-coupled computer systems so that the computer-readable code may be stored and executed in a distributed fashion. Also, functional programs, codes, and code segments for accomplishing the inventive concept may be easily construed by programmers skilled in the art to which the inventive concept pertains.

At least one of the components, elements or units represented by a block as illustrated in FIGS. 2 and 5 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of one component, element or unit may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of reducing a color moire using an image processor, the method comprising:
   calculating, by a local mean calculator, a plurality of local color mean values around a pixel in a selected region of a current image, the plurality of local color mean values comprising a first local color mean value of a first color, a second local color mean value of a second color, and a third local mean value of a third color;
   calculating, by the local mean calculator, difference values between the plurality of local color mean values, the difference values comprising a first difference value between the first local color mean value and the second local color mean value, a second difference value between the second local color mean value and the third local color mean value, and a third difference value between the first local color mean value and the third local color mean value;
   calculating, by the local mean calculator, a maximum difference value from among the difference values, the maximum difference value corresponding to a largest value among the first difference value, the second difference value, and the third difference value; and
   setting, by a weight setter, a moire correction weight to the pixel on the basis of the maximum difference value.

2. The method of claim 1, wherein the setting the moire correction weight comprises setting a value between a minimum weight and a maximum weight as the moire correction weight such that the maximum difference value and the moire correction weight are proportional to each other.

3. The method of claim 2, wherein the minimum weight and the maximum weight are 0 and 1, respectively, or 0 and 255, respectively.

4. The method of claim 1, further comprising correcting color values of the pixel by applying the moire correction weight to the color values of the pixel.

5. The method of claim 4, wherein a value of the moire correction weight is set between a minimum weight and a maximum weight, and
   wherein a moire correction degree of the pixel to be corrected is in inverse proportion to the value of the moire correction weight.

6. The method of claim 1, wherein the setting the moire correction weight comprises:
   setting a maximum value of the moire correction weight to the pixel in response to the maximum difference value being greater than a threshold value; and
   setting a minimum value of the moire correction weight to the current pixel in response to the maximum difference value being smaller than or equal to the threshold value.

7. The method of claim 6, further comprising:
   correcting a pixel value of the pixel by applying the maximum value of the moire correction weight to the pixel to generate an output pixel value which is substantially the same as the pixel value of the pixel before the correcting, in response to the maximum difference value being greater than the threshold value; and
   correcting a pixel value of the pixel by applying the minimum value of the moire correction weight to the pixel to generate an output pixel value which is more-corrected in response to the maximum difference value being smaller than or equal to the threshold value.

8. The method of claim 6, wherein the pixel is determined as being included in an edge region of an object in the current image in response to the maximum difference value being greater than the threshold value.

9. The method of claim 1, further comprising:
   calculating a plurality of global color mean values of a previous image that is input before the current image; and
   compensating the local color mean values of the current image by using the global color mean values of the previous image,
   wherein the calculating the difference values between the local color mean values and the maximum difference value comprises calculating difference values between the compensated local color mean values of the current image and a maximum difference value from among the different values between the compensated local color mean values.

10. A non-transitory computer readable recording medium having recorded thereon a program for executing the method of claim 1.

11. An apparatus for reducing color moire, the apparatus comprising:
   a processor; and
   a non-transitory computer-readable storage medium storing instructions which, when executed by the processor, cause the processor to:
      calculate a plurality of local color mean values around a pixel in a selected region of a current image, the plurality of local color mean values comprising a first local color mean value of a first color, a second local color mean value of a second color, and a third local mean value of a third color,
      calculate difference values between the plurality of local color mean values, the difference values comprising a first difference value between the first local color mean value and the second local color mean value, a second difference value between the second local color mean value and the third local color mean value, and a third difference value between the first local color mean value and the third local color mean value, and
      calculate a maximum difference value from among the difference values, the maximum difference value corresponding to a largest value among the first difference value, the second difference value, and the third difference value; and
      set a moire correction weight to the pixel on the basis of the maximum difference value.

12. The apparatus of claim 11, wherein the non-transitory computer-readable storage medium stores additional instructions which, when executed by the processor, cause the processor to set a value between a minimum weight and a maximum weight as the moire correction weight such that the maximum difference value and the moire correction weight are proportional to each other.

13. The apparatus of claim 12, wherein the minimum weight and the maximum weight are 0 and 1, respectively, or 0 and 255, respectively.

14. The apparatus of claim 11, wherein the non-transitory computer-readable storage medium stores additional instructions which, when executed by the processor, cause the processor to correct color values the pixel by applying the moire correction weight to the color values of the pixel.

15. The apparatus of claim 14, wherein a value of the moire correction weight is set between a minimum weight and a maximum weight, and
wherein a moire correction degree of the pixel to be corrected is in inverse proportion to the value of the moire correction weight.

16. The apparatus of claim 11, wherein the non-transitory computer-readable storage medium stores additional instructions which, when executed by the processor, cause the processor to set a maximum value of the moire correction weight to the pixel in response to the maximum difference value being greater than a threshold value, and set a minimum value of the moire correction weight to the pixel in response to the maximum difference value being smaller than or equal to the threshold value.

17. The apparatus of claim 16, wherein the non-transitory computer-readable storage medium stores additional instructions which, when executed by the processor, cause the processor to correct a pixel value of the pixel by applying the maximum value of the moire correction weight to the pixel to generate an output pixel value which is substantially the same as the pixel value of the pixel before the correcting, in response to the maximum difference value being greater than the threshold value, and correct a pixel value of the pixel by applying the minimum value of the moire correction weight to the pixel to generate an output pixel value which is more-corrected in response to the maximum difference value being smaller than or equal to the threshold value.

18. The apparatus of claim 16, wherein the pixel is determined as being included in an edge region of an object in the current image in response to the maximum difference value being greater than the threshold value.

19. The apparatus of claim 11, wherein the non-transitory computer-readable storage medium stores additional instructions which, when executed by the processor, cause the processor to:
calculate a plurality of global color mean values of a previous image that is input before the current image; and
compensate the local color mean values of the current image by using the global color mean values of the previous image, and calculate difference values between the compensated local color mean values of the current image and a maximum difference value from among the different values between the compensated local color mean values.

20. An image processing apparatus comprising:
an image sensor configured to capture the current image; and
an image processor comprising the apparatus of claim 11.

* * * * *